(12) United States Patent
Hobbs

(10) Patent No.: US 10,258,029 B2
(45) Date of Patent: Apr. 16, 2019

(54) DRIFT FENCE CAMERA TRAP

(71) Applicant: Michael T. Hobbs, San Jose, CA (US)

(72) Inventor: Michael T. Hobbs, San Jose, CA (US)

( * ) Notice: Subject to any disclaimer, the term of this patent is extended or adjusted under 35 U.S.C. 154(b) by 261 days.

(21) Appl. No.: 15/177,754

(22) Filed: Jun. 9, 2016

(65) Prior Publication Data

US 2017/0035040 A1 Feb. 9, 2017

Related U.S. Application Data

(63) Continuation-in-part of application No. 14/817,017, filed on Aug. 3, 2015.

(51) Int. Cl.
*H04N 5/33* (2006.01)
*H04N 7/18* (2006.01)
*A01K 29/00* (2006.01)
*A01M 23/00* (2006.01)
*H04N 5/225* (2006.01)

(52) U.S. Cl.
CPC ........... *A01M 23/00* (2013.01); *A01K 29/005* (2013.01); *H04N 5/2256* (2013.01); *H04N 5/2257* (2013.01); *H04N 5/33* (2013.01); *H04N 7/188* (2013.01)

(58) Field of Classification Search
CPC ... A01M 23/00; A01K 29/005; H04N 5/2256; H04N 5/33; H04N 7/188
See application file for complete search history.

(56) References Cited

U.S. PATENT DOCUMENTS

| | | | |
|---|---|---|---|
| 8,651,057 B1 * | 2/2014 | Welsh | A01K 61/90 119/200 |
| 2005/0000170 A1 * | 1/2005 | DiDomenico | E02D 5/80 52/155 |
| 2015/0282471 A1 * | 10/2015 | Lampman | A01K 3/002 119/712 |

OTHER PUBLICATIONS

TrailMaster Infrared Trail Monitors TM1550; http://www.trailmaster.com/pdf/TM1550.pdf.

* cited by examiner

*Primary Examiner* — Michael E Teitelbaum
(74) *Attorney, Agent, or Firm* — Douglas L. Weller

(57) ABSTRACT

A drift fence camera trap enclosure includes a frame and sheathing mounted on the frame. An opening extends from a first side of the drift fence camera trap enclosure to a second side of the drift camera enclosure. A threshold is located within the opening. A detection unit detects passage of an animal over the threshold. A camera is configured to capture pictures or video of the animal as the animals cross the threshold.

15 Claims, 17 Drawing Sheets

US 10,258,029 B2

DRIFT FENCE CAMERA TRAP

BACKGROUND

Wildlife surveys are helpful to determine populations of wildlife in various habitats. This helps to determine what species are thriving and what species are rare. Field surveys can be conducted with visual searches including those using binoculars. Dip netting and meadow surveys also can be used. Nocturnal surveys can be performed. Often times survey areas can be selected with natural boundaries to reduce the effect of dispersal. A survey can be a complete survey of a defined area, or can be performed by sampling.

DETAILED DESCRIPTION

A camera system can be used for any constricted area where an elevated threshold can be placed across the constricted area and images and/or video recordings are made of cold-blooded animals and small mammals traversing the constricted area by passing over the elevated threshold. For example, the camera system can be used within a tunnel or along a drift fence.

Figure 1:
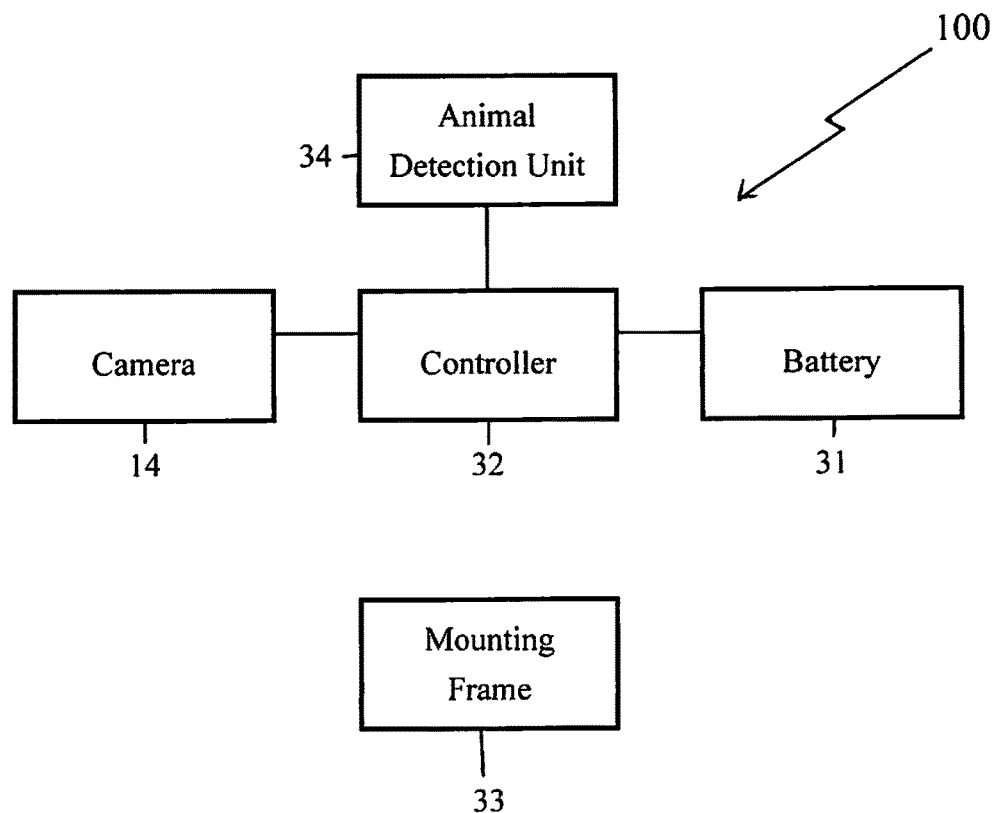
FIG. 1 is a block diagram of a tunnel camera system in accordance with an embodiment.

FIG. 1 is a block diagram of a tunnel camera system 100. Tunnel camera system 100 is inserted into a tunnel at its entrance. Tunnel camera system 100 can be slid back into the tunnel, out of view of humans passing by the tunnel. Tunnel camera system 100 takes pictures and/or videos of all small and medium sized animals (cold-blooded and medium sized warm-blooded) that access the tunnel. The pictures or video can be used, for example, when collecting qualitative and quantitative data for scientific studies.

Tunnel camera system 100 consists of four sub-assemblies. The four sub-assemblies are a camera 14, an animal detection unit 34, a battery 31 and a controller 32. When the four assemblies of tunnel camera system 100 are mounted on a frame 33, the result is called a tunnel camera trap.

While in FIG. 1, controller 32 is shown separate from camera 14, controller 32 may be integrated into camera 14.

Figure 2:
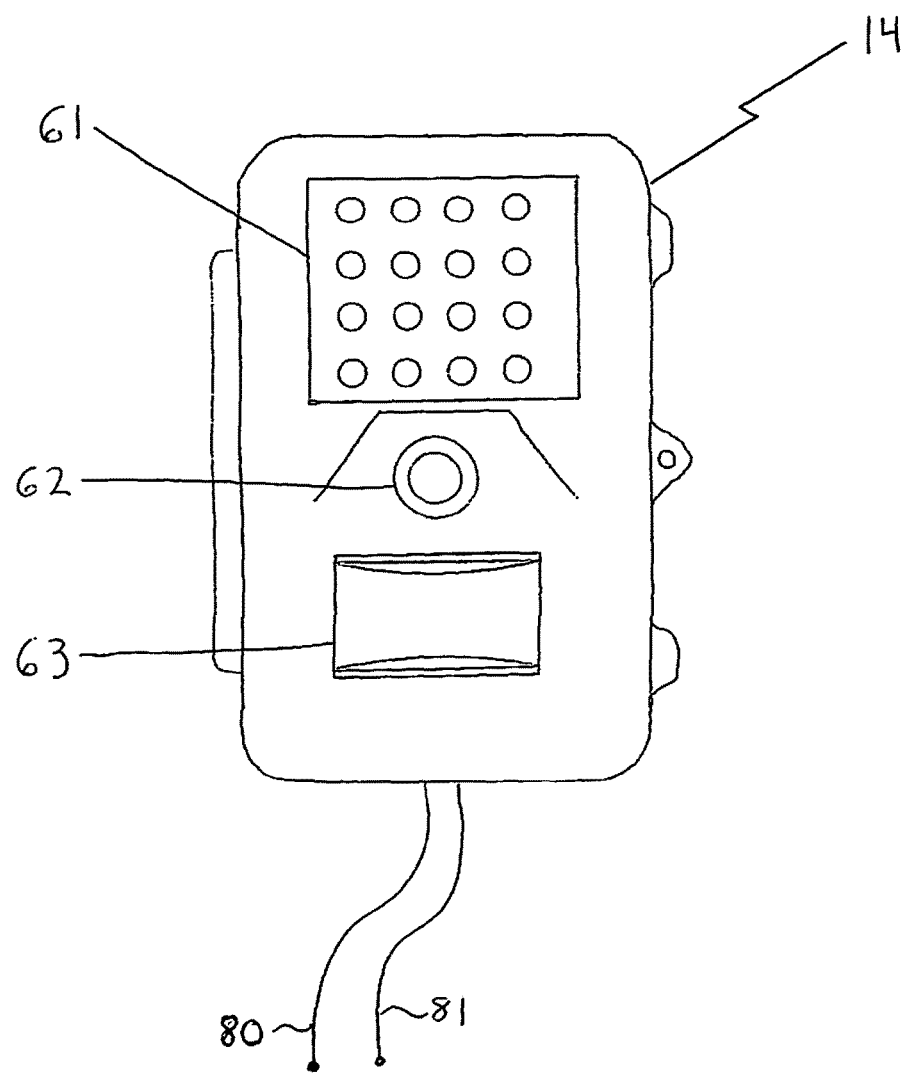
FIG. 2 shows a game/trail camera in accordance with the prior art.

Camera 14 is shown in FIG. 2. For example, camera 14 is either a game camera or a trail camera that includes a camera lens 62, a passive infrared (PIR) motion sensor 63 and an infrared (IR) flash 61. For example, passive infrared (PIR) motion sensor 63 utilizes a pyroelectric device that senses heat and motion.

When activated by heat and motion, passive infrared (PIR) motion sensor 63 generates signals that are used to initiate capturing a visual recording. The visual recording is, for example, a picture or a video, depending upon camera configuration. Infrared flash 61 is utilized in dark environments, for example, using infrared (IR) light emitting diodes (LEDs). The infrared flash projects infrared illumination in a light spectrum that is not detectable by animals being illuminated for the purpose of recording their presence in dark environments.

Figure 3:
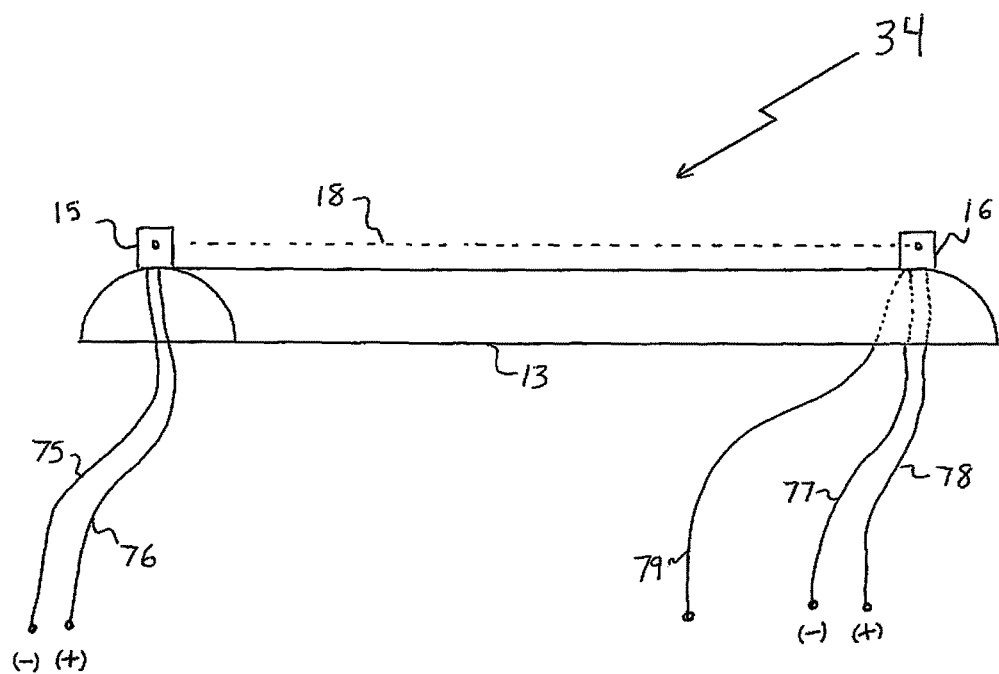
FIG. 3, FIG. 4 and FIG. 5 illustrate use of an animal detection unit within a tunnel camera system in accordance with an embodiment.
Figure 4:
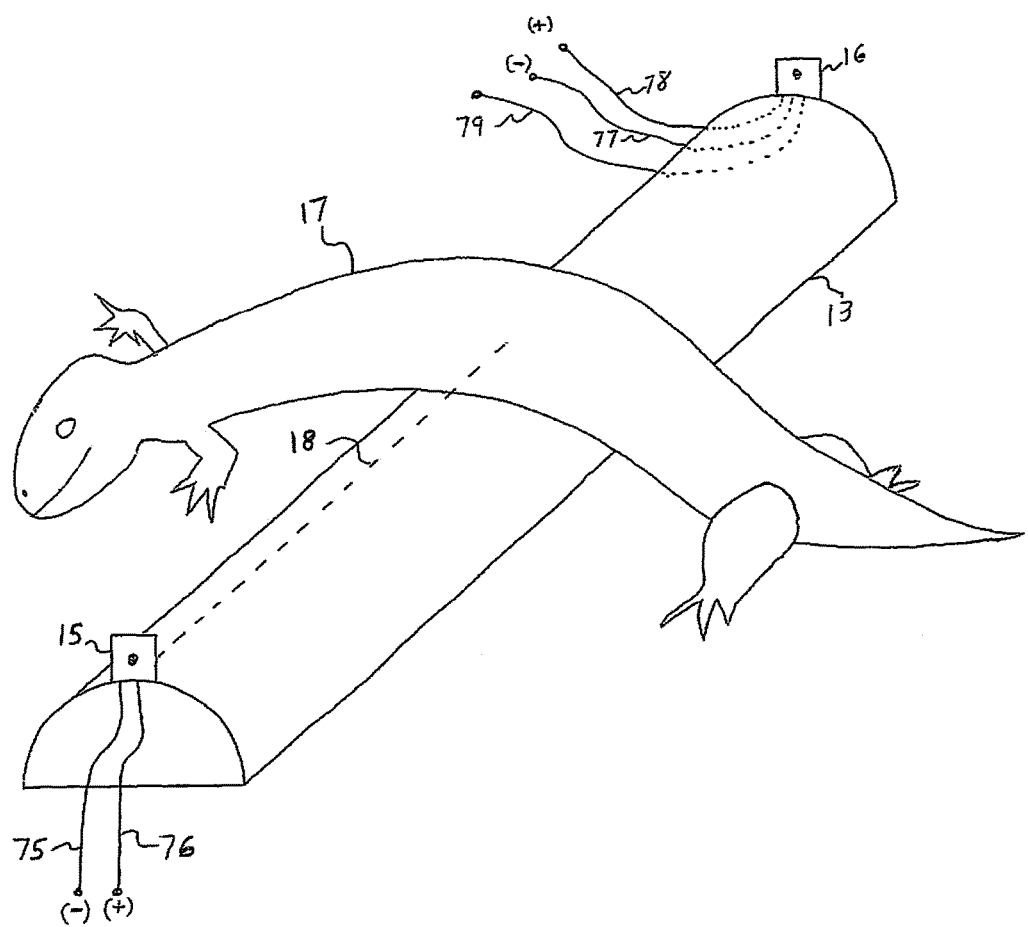
Figure 5:
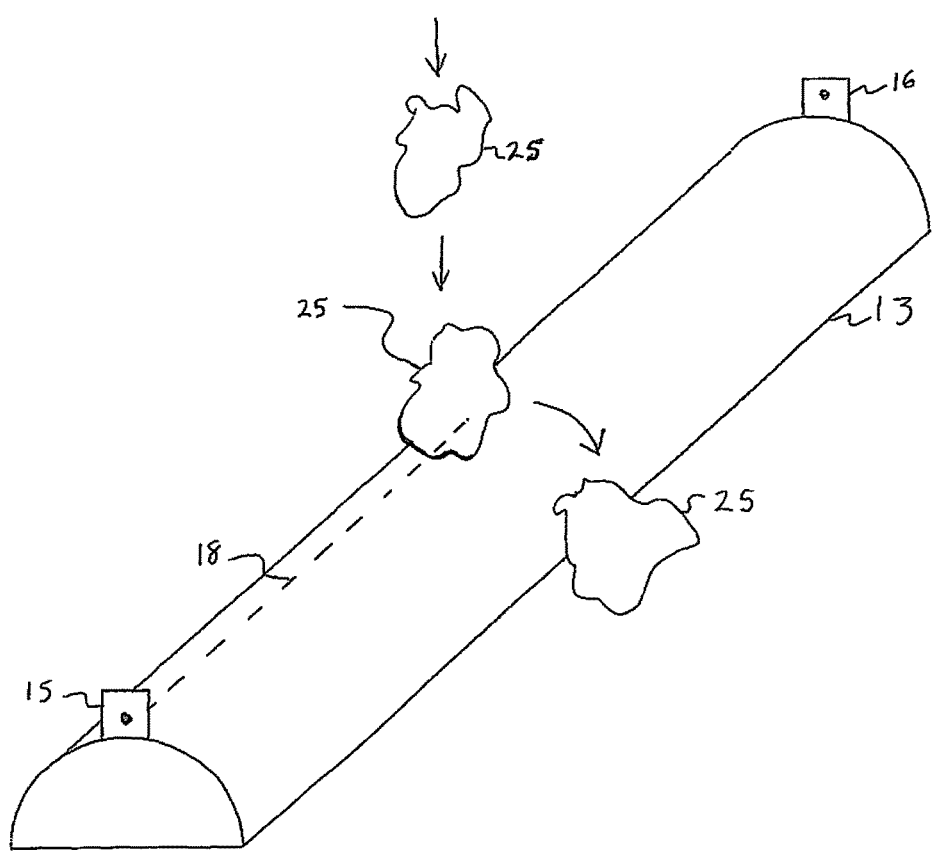

FIG. 3, FIG. 4 and FIG. 5 provided details of animal detection unit 34. As shown in FIG. 3, a photo emitter 15 produces a light beam 18 in the direction of a photoelectric receiver 16. For example, the light beam is a narrow LED light beam. Photo emitter 15 and photoelectric receiver 16 are mounted on opposite ends of an elevated threshold 13. Elevated threshold 13 lies on the ground within a tunnel, perpendicular to the length of the tunnel. As illustrated in FIG. 4, when an animal 17, such as an amphibian, reptile or small mammal, crosses elevated threshold 13, animal 17 temporarily blocks light beam 18 from reaching photoelectric receiver 16. This allows production of a trigger signal forwarded to controller 32. Upon receipt of the trigger signal, controller 32 signals camera 14 to capture a visual recording (such as a picture and/or a video) of animal 17, whether in daylight or darkness.

The use of elevated threshold 13 is particularly important when capturing cold-blooded animals and small mammals traversing through the tunnel. By cold-blooded animals are meant amphibians (e.g., salamanders and frogs), reptiles (e.g., snakes and lizards) and large invertebrates (e.g., scorpions and tarantulas). By small mammals are meant mammals under 680 grams (1.5 lbs.), such as mice, rats, moles, voles, and squirrels.

A passive infrared (PIR) motion sensor will detect medium and large sized warm-blooded animals based on heat and motion sensing. By medium size mammals are meant mammals from 680 grams to 3629 grams (1.5 to 8 lbs.), such as raccoons, opossums and skunks. However, a PIR motion sensor cannot consistently or reliably detect cold-blooded animals and small mammals traversing through the tunnel. Animal detection unit 34 factates detection of cold-blooded animals and small mammals. Typically, cold-blooded animals such as salamanders, frogs, snakes, lizards, and large invertebrates of various species are fairly small. For this reason, the height of light beam 18 is adjusted so that these types of amphibians, small reptiles and large invertebrates will break beam 18 when traversing over elevated threshold 13. If desired, several light beams can be used to detect animals of various sizes.

Elevated threshold 13 is shaped so that amphibians, reptiles, large invertebrates and small mammals can easily traverse it. Elevated threshold 13 is also shaped so that it discourages debris build up on top of elevated threshold 13. For example, as shown in FIG. 5, elevated threshold 13 is shaped essentially as a half cylinder so that debris, represented in FIG. 5 by debris 25, will roll off of elevated threshold 13. This will prevent, or at least hinder, debris build-up from blocking light beam 18. For example, elevated threshold 13 is made of plastic, wood, metal or some other material.

Figure 6:
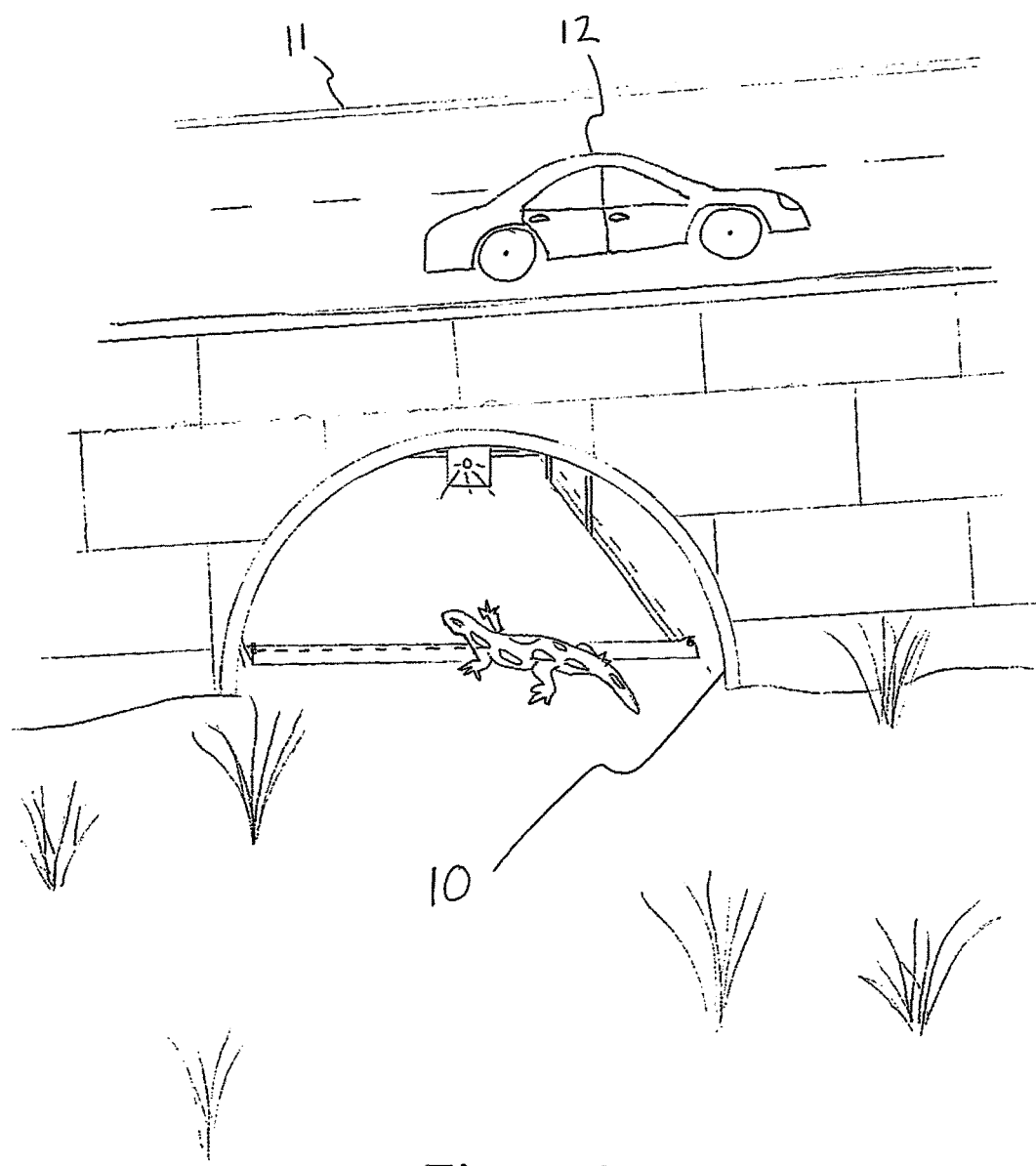
FIG. 6 illustrates a tunnel camera system within a tunnel in accordance with an embodiment.

FIG. 6 illustrates function of tunnel camera system 100 within a tunnel 10. Tunnel 10 is, for example, located under a road 11 on which automobiles 12 pass. Tunnel 10 provides a route for small animals to pass under road 11 without the threat of injury from automobiles 12.

Tunnel camera system 100 can be slid back into tunnel 10, out of view of humans passing by tunnel 10. Elevated threshold 13 extends across the width of tunnel 10 so that any animal 17 passing through tunnel 10 will need to cross elevated threshold 13. As any animal 17 traverses tunnel 10 and crosses threshold 13, animal 17 will temporarily block transmission of light beam 18 from photo emitter 15 to photoelectric receiver 16. As a result, photoelectric receiver 16 will send a trigger signal to controller 32. Controller 32 will signal camera 14 to capture an image or video of animal 17.

Figure 7:
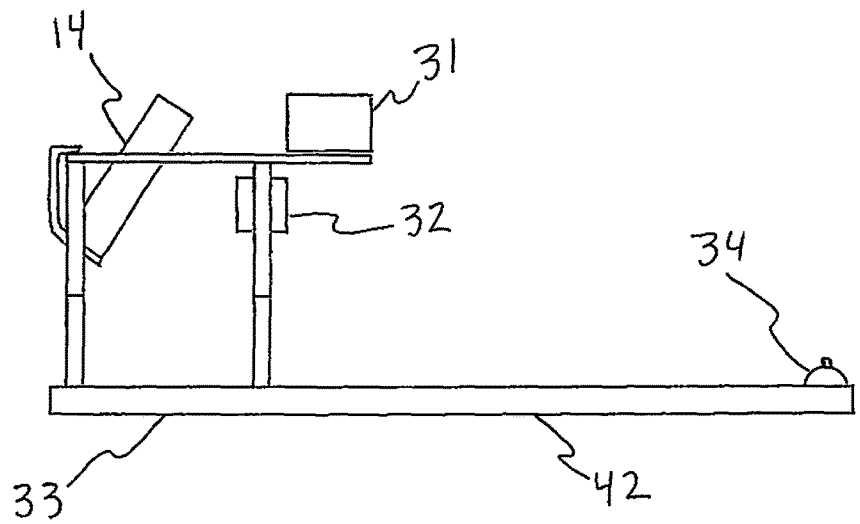
FIG. 7 is a side view of a mounting frame within a tunnel camera system in accordance with an embodiment.
Figure 8:
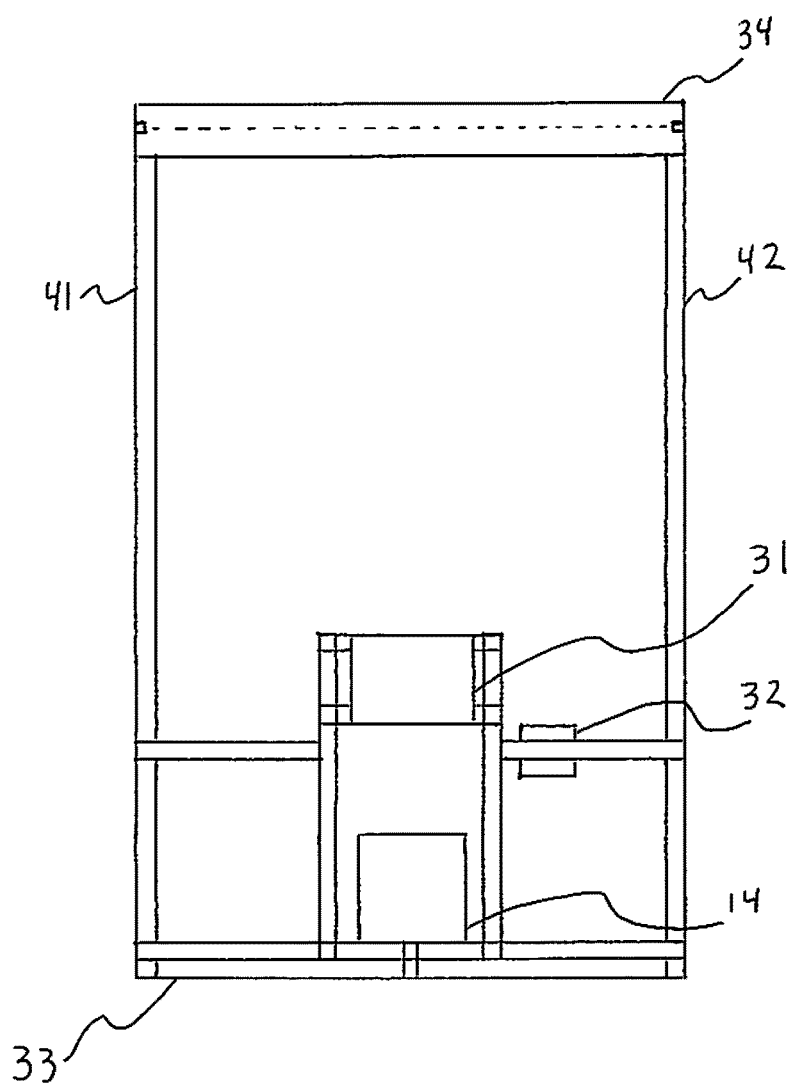
FIG. 8 is a top view of the mounting frame shown in FIG. 7 in accordance with an embodiment.
Figure 9:
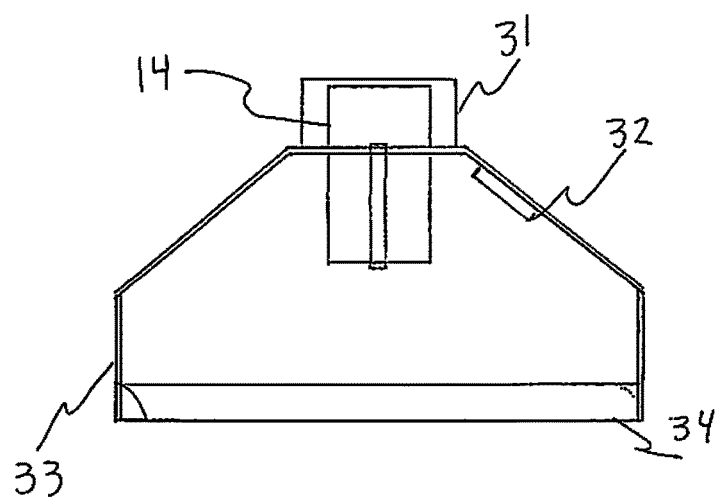
FIG. 9 is a rear view of the mounting frame shown in FIG. 7 in accordance with an embodiment.

FIG. 7 is a side view, FIG. 8 is a top view and FIG. 9 is a rear view of a configuration of mounting frame 33. Mounting frame 33 supports and connects camera 14, controller 32, battery 31 and animal detection unit 34. For example, battery 31 supplies the animal detection unit 34 with +12 volts DC. For example, battery 31 is a sealed non-spillable battery sized to fit with a tunnel configuration. A battery with a four-inch length, three and one half inch width and two and three quarters inch height works well for many tunnel configurations. For example, when battery 31 is a five amperage-hours battery, battery 31 can power animal detection unit 34 for two weeks, depending on frequency of triggers. For example, camera 14 has its own battery and is not powered by battery 31.

Mounting frame 33 is custom made to fit tunnels of different shapes and sizes. For example, a standard mounting frame can be designed to fit an original equipment manufactured tunnel type.

For example, mounting frame 33 shown in FIGS. 7 and 8 is configured to fit and conform to one type of tunnel available from ACO wildlife INT. See http://www.aco-wildlife.com.

Mounting frame 33 needs to conform as close as possible to tunnel walls in tunnel 10. Mounting frame 33 in combination with tunnel 10 should be sized so that animals will not be discouraged from passing through tunnel 10.

Various factors are generally taken into account when configuring mounting frame 33. These include, for example, camera lens focal length and tunnel height and width. The focal length of camera lens 62 is a critical first step in designing mounting frame 33. The focal length must target animal detection unit 34 where animals cross, breaking light beam 18 to trigger capture of a picture and/or video. The focal length must span the full breadth of elevated threshold 13. This ensures pictures and/or videos of animals will be captured and correctly focused as the animals cross elevated threshold 13.

For example, for a typical small tunnel, mounting frame 33 is designed to accommodate a camera lens focal length of 460 millimeters. A typical height for frame 33 is nine inches. A typical width of frame 33 is 18.5 inches, when elevated threshold 13 is equally 18.5 inches across. For example, camera lens 62 is centered and mounted eight and seven eighths inches above the tunnel floor. The camera body of game trail camera 14 is tilted 22 to 24 degrees down, towards elevated threshold 13. Elevated threshold 13 is mounted 23 inches ahead of camera lens 62 by a bar 41 and a bar 42 shown in FIG. 8.

Figure 10:
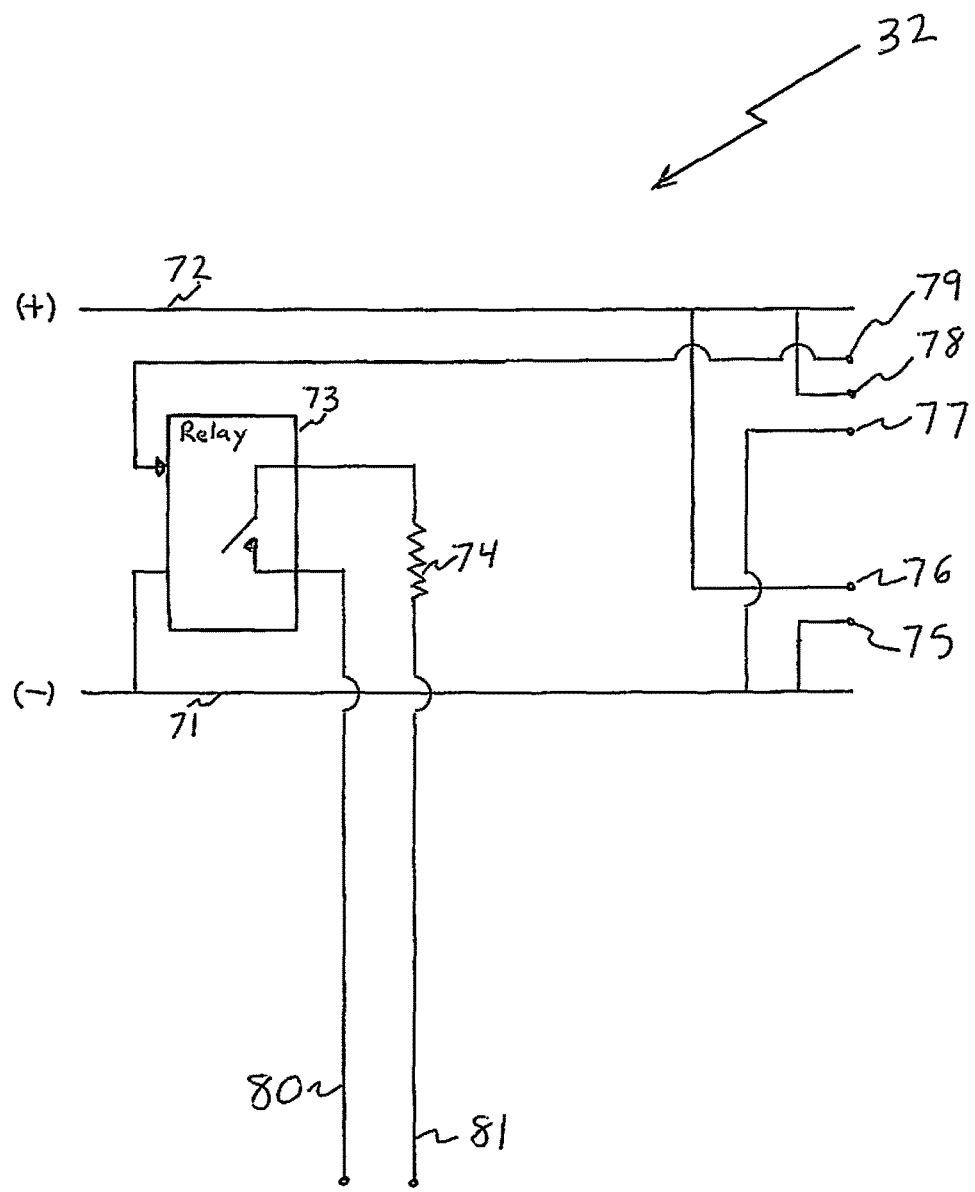
FIG. 10 is a schematic illustrating function of a control circuit of a tunnel camera system in accordance with an embodiment.

FIG. 10 is a schematic illustrating function of control circuit 32. Control circuit 32 includes a ground line 71 and a twelve-volt DC line 72 connected to battery 31. Lines 71 and 72 are connected to and provide power to photo emitter 15 and photoelectric receiver 16. Lines 75 and 76 are connected and provide power to photo emitter 15. Lines 77 and 78 are connected to and provide power to photoelectric receiver 16. Line 79 is connected to photoelectric receiver 16 and generates a trigger signal from photoelectric receiver 16 when light beam 18 is hindered from reaching photoelectric receiver 16. A line 80 and a line 81 are connected to a passive infrared (PIR) motion sensor 63. Line 80 is connected to a drain pin of a pyroelectric field effect transistor (FET) within PIR motion sensor 63. Line 81 is connected to a source pin of the pyroelectric field effect transistor (FET) within PIR motion sensor 63.

When the trigger signal from photoelectric receiver 16 is received by a relay 73, relay 73 completes a circuit from line 80 through a resistor 74 to line 81, signaling to PIR motion sensor 63 detection of an animal travelling across elevated threshold 13. For example, resistor 74 is a ten Megohm resistor. Completion of a circuit from line 80 through a resistor 74 to line 81 causes PIR motion sensor 63 to react exactly as it does when PIR motion sensor 63 detects heat/motion. Connecting line 80 to the source pin of the pyroelectric field effect transistor (FET) within PIR motion sensor 63 and line 81 of the pyroelectric field effect transistor (FET) within PIR motion sensor 63 configures camera 14 to take pictures or videos whenever PIR motion sensor 63 detects heat/motion and when animal detection unit 34 detects traversal of elevated threshold 13.

The resistor configuration can vary provided there is resistance when relay 73 completes the circuit between line 80 and line 81. For example, while in FIG. 10 resistor 74 is connected to line 81, instead resistor 74 can be connected to line 80. Alternatively, a resistor can be attached to either line 81 or line 82. The resistor configuration can vary provided there is resistance when relay 73 completes the circuit between line 80 and line 81.

Figure 11:
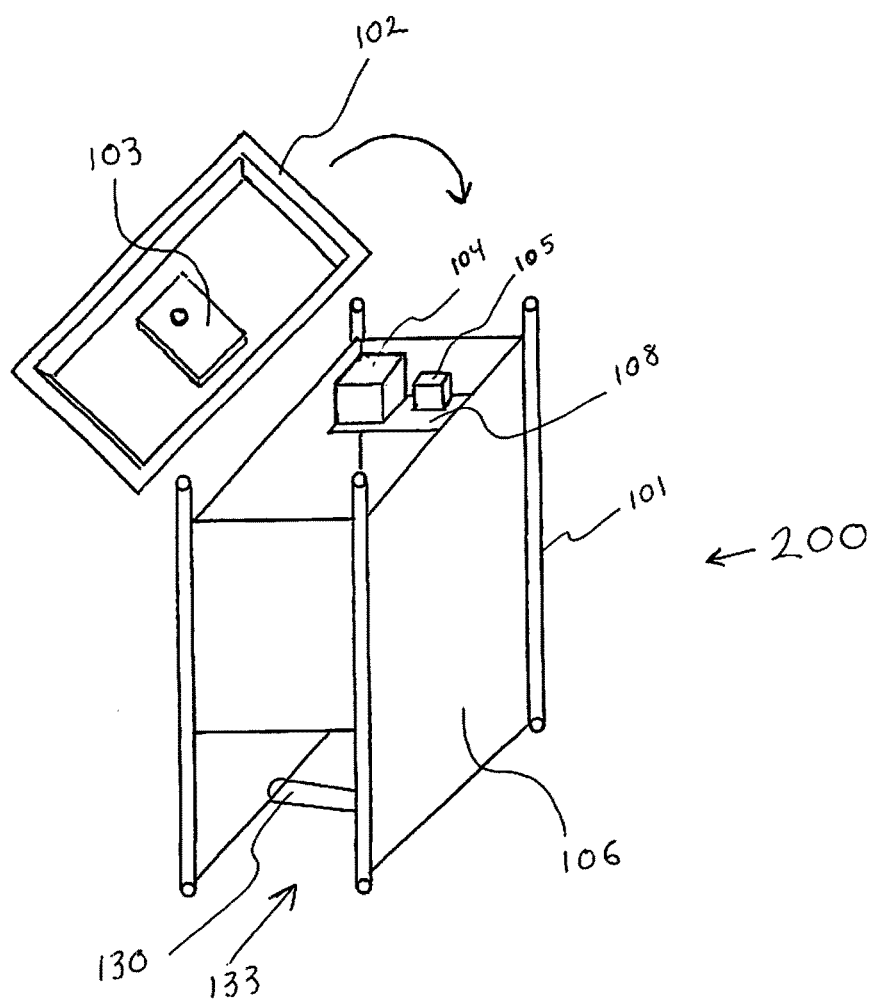
FIG. 11 is a simplified diagram illustrating a drift fence camera trap, in accordance with an embodiment.

FIG. 11 shows a drift fence camera trap 200 with a lid 102 removed to show a camera 103. A battery 104 and a controller 105 are placed on a shelf 108. A frame 101 for drift fence camera trap 200 is, for example, constructed from metal tubes. Alternatively, frame 101 can be constructed of polyvinyl chloride (PVC) pipe or another material structurally suited to form a frame. Sheathing 106 can be composed of metal sheeting, plastic, wood, cloth or some other material suitable for sheathing. Dimensions for drift fence camera trap 200 vary depending upon application. For example, a drift fence camera trap configured to gather information about small reptiles, mammals and amphibians, and large invertebrates could be nine inches wide, sixteen inches long and twenty-three inches high. When lid 102 is in place on drift fence camera trap 200, camera 103 is configured to face toward a detection unit 130.

Animals travel through opening 133 of drift fence camera trap 200 and traverse detection unit 130, crossing an elevated threshold to cross a light beam that triggers camera 103 to take a picture or video of the animals, as discussed above for tunnel camera system 100.

Figure 12:
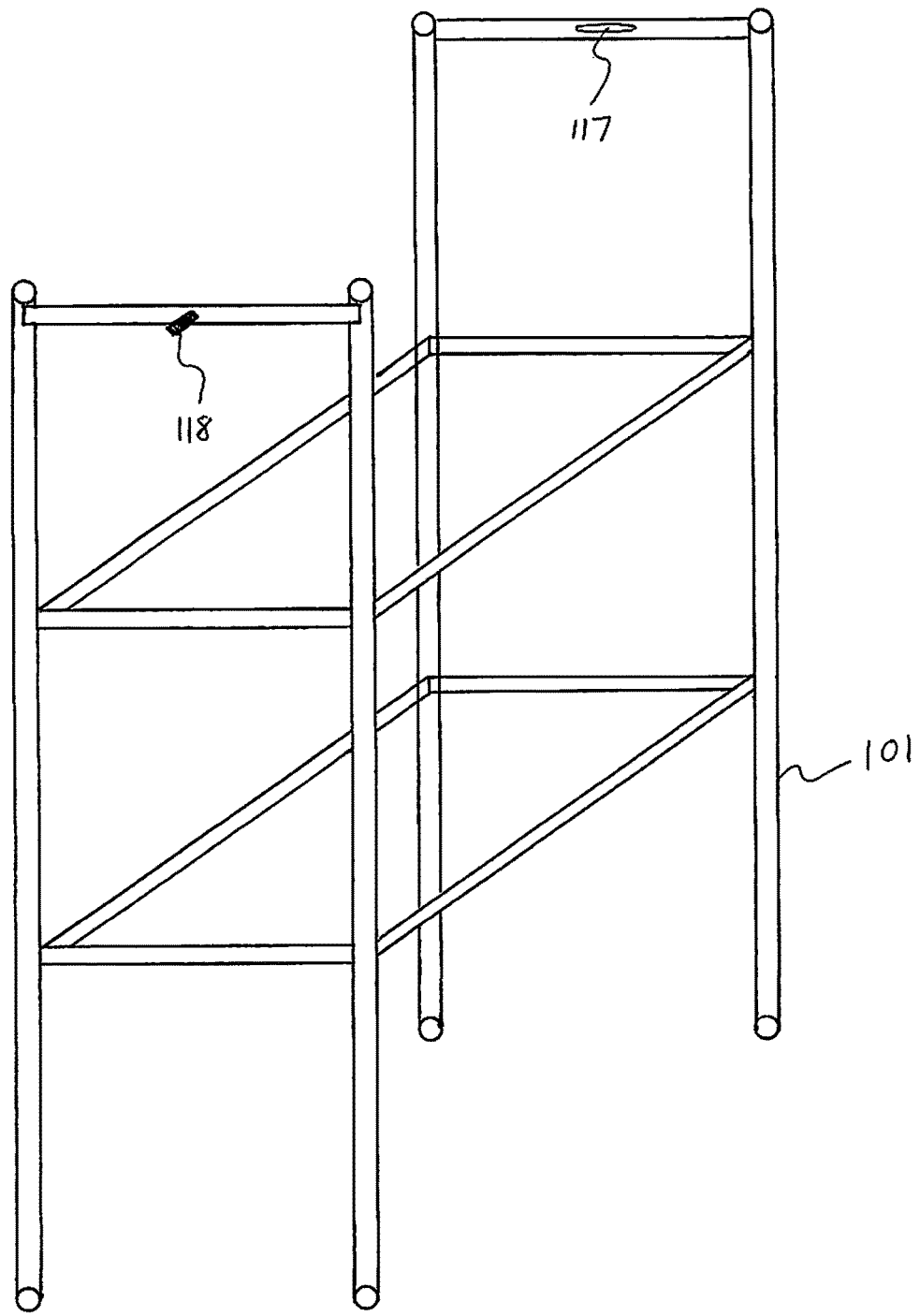
FIG. 12 shows a tubular frame for a drift fence camera trap, in accordance with an embodiment.

FIG. 12 shows details of tubular frame 101 for drift fence camera trap 200. Tubular frame 101 includes a locking pin 118 and a sash lock hole 117 used to hold lid 102 securely to tubular frame 101.

Figure 13:
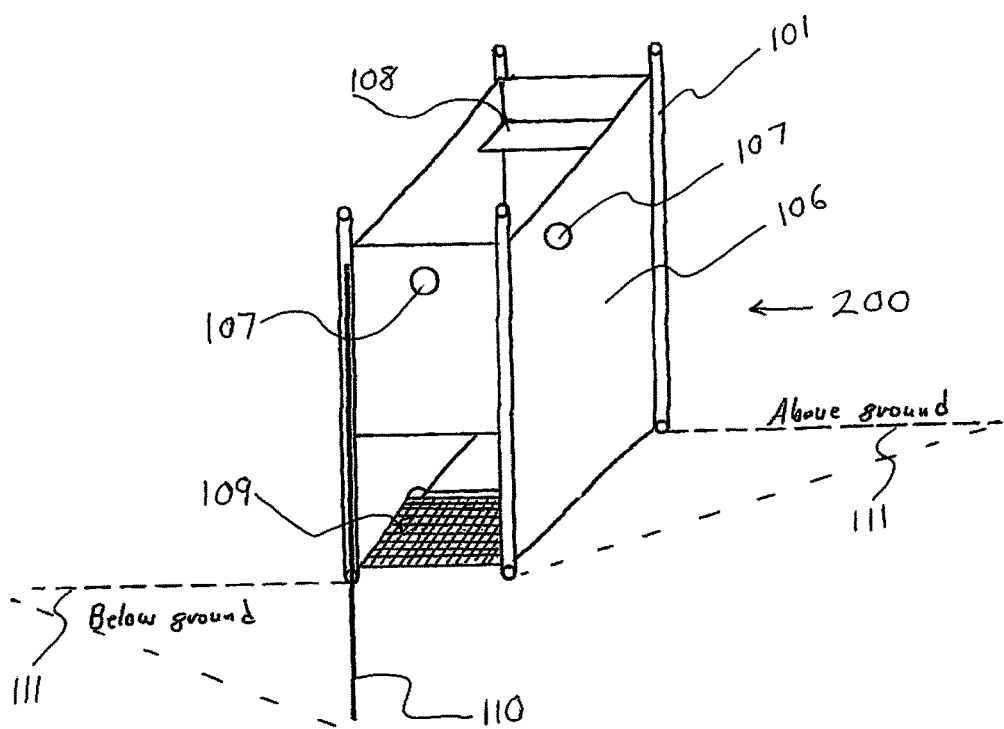
FIG. 13 is a simplified diagram illustrating anchoring a drift fence camera trap for use along a drift fence, in accordance with an embodiment.

FIG. 13 shows air flow holes 107 placed in sheathing 106 of drift fence camera trap 200. A flat grid matrix ramp 109 may be used to help when measuring size of animals captured in pictures or video taken by camera 103. Dotted lines 111 in FIG. 13 represent ground level. Mounting spikes, represented in FIG. 13 by a mounting spike 110, can be driven through tubing of frame 101 into the ground to hold drift fence camera trap 200 in a stable position on the ground. For example, four mounting spikes can be used, one for each corner tube of frame 101.

Figure 14:
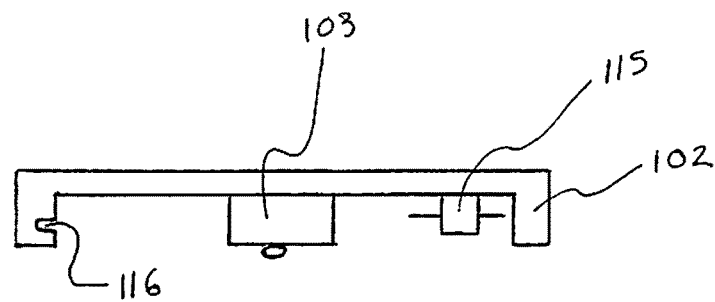
FIG. 14 is a side view of a lid for a drift fence camera trap, in accordance with an embodiment.
Figure 15:
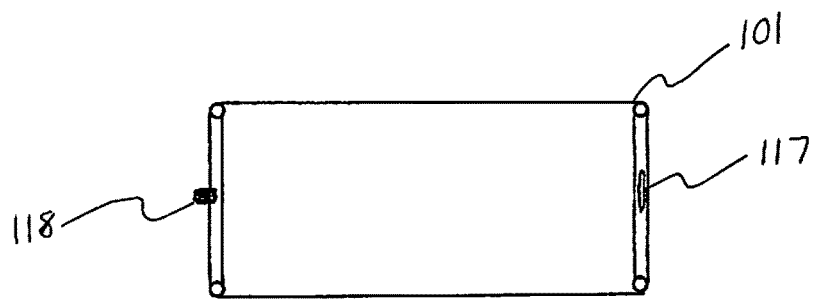
FIG. 15 is a top down view of a drift fence camera trap, in accordance with an embodiment.
Figure 16:
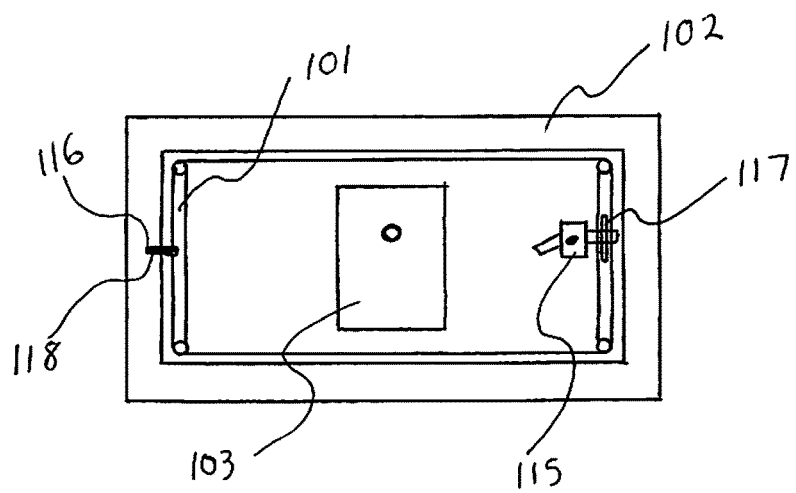
FIG. 16 is a bottom up view of a drift fence camera trap, in accordance with an embodiment.

FIG. 14, FIG. 15 and FIG. 16 show detail of lid 102 being secured to frame 101. FIG. 14 is a side view showing additional detail of lid 102. FIG. 15 is a top down view of frame 101 ready to receive lid 102. FIG. 16 is a bottom up view of lid 102 attached to frame 101. A locking pin slot 116 receives locking pin 118 mounted on frame 101. When lid 102 is in position on frame 101, a sash lock 115 is inserted into sash lock hole 117 on frame 101 to secure lid 102 to frame 101.

Figure 17:
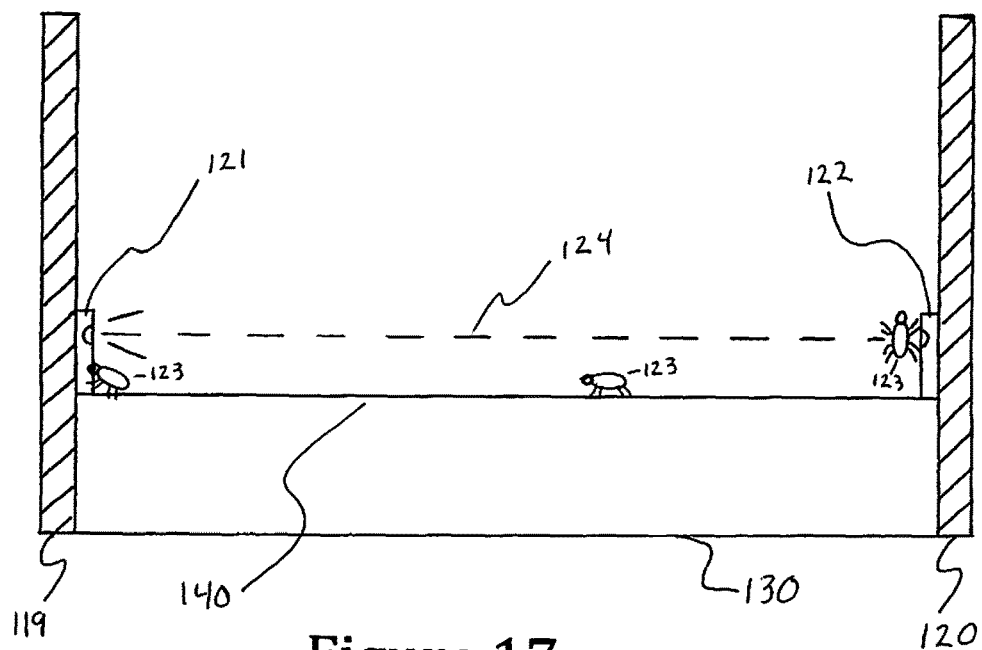
FIG. 17 shows an implementation of a detection unit, in accordance with an embodiment.

FIG. 17 shows details of detection unit 130. A photo emitter 121 is mounted on an internal wall 119 of drift fence camera trap 200 and emits a photo beam 124. A photoelectric receiver 122 is mounted on an internal wall 120 of drift fence camera trap 200 and receives photo beam 124. Small animals crossing an elevated threshold 140 will cross photo beam 124 causing camera 103 to take picture or video of the animals.

Figure 18:
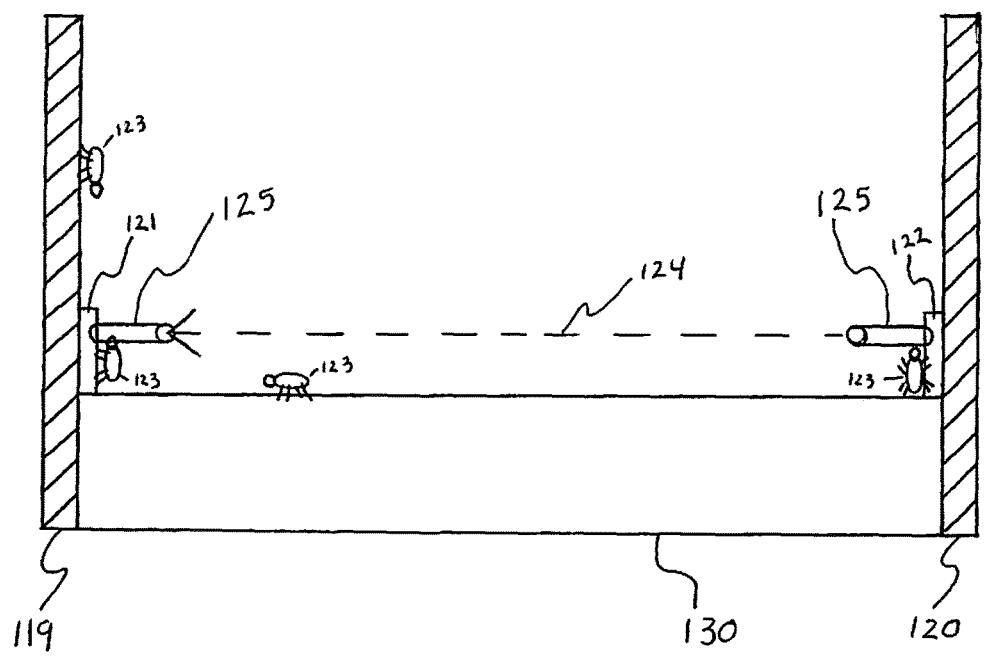
FIG. 18 illustrates use of bug tubes within a drift fence camera trap or in a tunnel, in accordance with an embodiment.

Bugs 123 crawling on wall 119 or wall 120 can also cross beam 124 causing camera 103 to take a picture or video when there is no animal crossing photo beam 124. This can be partially remedied by the use of bug tubes 125 shown in FIG. 18. Bug tubes 125 protect light beam 124 from bugs crawling on wall 119 and wall 120. Bug tubes 125 guide bugs 123 around light beam 124 so that the bugs do not cross light beam 124. For example, wall 119 and wall 120 are implemented by sheathing 106 on frame 101.

Detection unit 130 with bug tubes 125 can also be used with other tunnel camera systems such as tunnel camera system 100.

Figure 19:
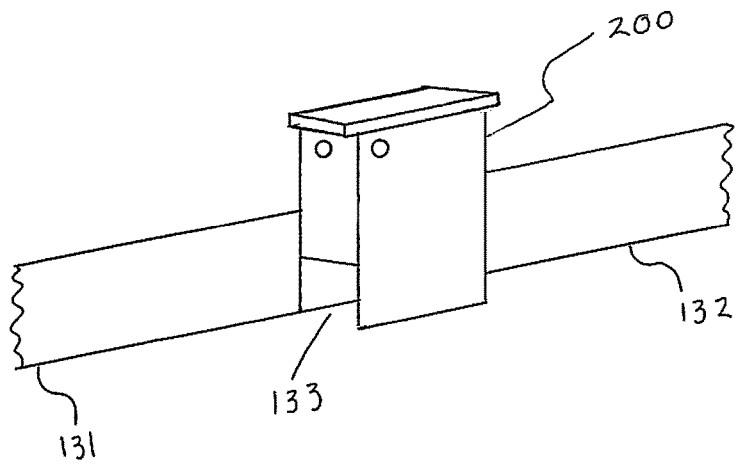
FIG. 19 and FIG. 20 show a drift fence camera trap placed along a drift fence, in accordance with an embodiment.
Figure 20:
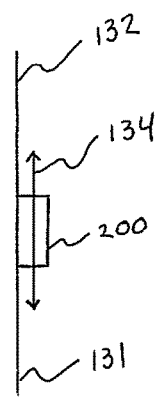

FIG. 19 and FIG. 20 show flush fence configuration where drift fence camera trap 200 is placed along a drift fence represented by a drift fence section 131 and a drift fence section 132. Animals following the drift fence will traverse drift fence camera trap 200 by traveling through opening 133 of drift fence camera trap 200. In FIG. 20, arrow 134 shows a direction of travel of animals along the drift fence configuration and through drift fence camera trap 200.

Figure 21:
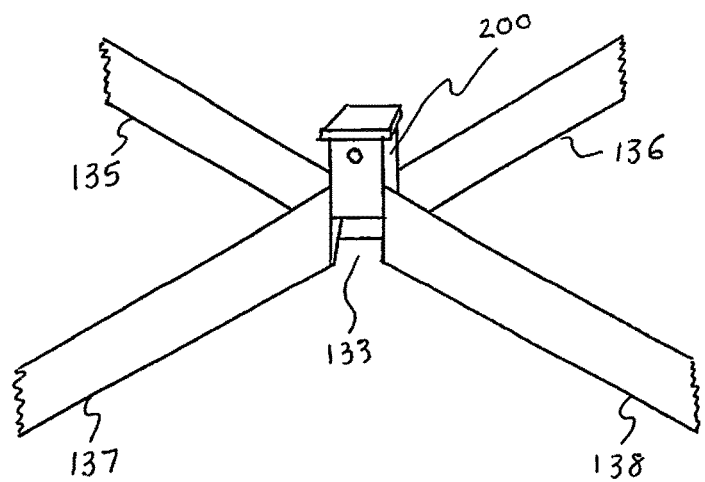
FIG. 21 and FIG. 22 show a drift fence camera trap used in another drift fence configuration, in accordance with an embodiment.
Figure 22:
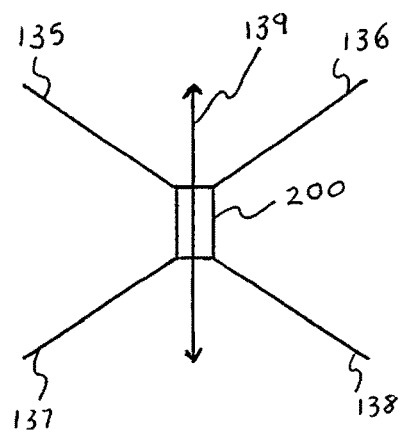

FIG. 21 and FIG. 22 show a funnel drift fence configuration where drift fence camera trap 200 is placed along funnel sections of a drift fence represented by a funnel drift fence section 135, a funnel drift fence section 136, a funnel drift fence section 137 and a funnel drift fence section 138. Animals following a funnel drift fence section will traverse drift fence camera trap 200 by traveling through opening 133 of drift fence camera trap 200. In FIG. 22, arrow 139 shows a direction of travel of animals along a funnel drift fence section and through drift fence camera trap 200.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A drift fence camera trap comprising
an enclosure;
an opening through which cold-blooded animals and small mammals traverse the enclosure;
an elevated threshold located within the opening;
a detection unit that detects passage of cold-blooded animals and small mammals over the elevated threshold;
a camera, configured to capture pictures or video of the cold-blooded animals and small mammals as the cold-blooded animals and small mammals cross the elevated threshold; and,
a drift fence that guides cold-blooded animals and small mammals to the opening, the drift fence including:
a first funnel drift section connected to the enclosure, the first funnel drift section extending to the ground so as to funnel cold-blooded animals and small mammals towards the enclosure,
a second funnel drift section connected to the enclosure, the second funnel drift section extending to the ground so as to funnel cold-blooded animals and small mammals towards the enclosure
a third funnel drift section connected to the enclosure, the third funnel drift section extending to the ground so as to funnel cold-blooded animals and small mammals towards the enclosure, and
a fourth funnel drift section connected to the enclosure, the fourth funnel drift section extending to the ground so as to funnel cold-blooded animals and small mammals towards the enclosure;
wherein the first funnel drift section is at an acute or an obtuse angle with respect to the second funnel drift section so that cold-blooded animals and small mammals from an area wider than the opening are funneled towards the opening; and
wherein the third funnel drift section is at an acute or an obtuse angle with respect to the fourth funnel drift section so that cold-blooded animals and small mammals from an area wider than the opening are funneled towards the opening.

2. A drift fence camera trap as in claim 1, additionally comprising:
a flat grid matrix ramp situated at or near the elevated threshold, the flat grid matrix ramp providing a matrix suitable for use in measuring size of the cold-blooded animals and small mammals in the captured pictures or video.

3. A drift fence camera trap as in claim 1, additionally comprising:
mounting spikes used to anchor the drift fence camera trap into ground.

4. A drift fence camera trap as in claim 1 wherein the camera is mounted on a lid of the drift fence camera trap.

5. A drift fence camera trap as in claim 1:
wherein the detection unit includes a light emitter and a photoelectric receiver, the light emitter directing light from the light emitter to the photoelectric receiver;
wherein the light emitter includes a first tube that extends out from a first wall a sufficient length so that bugs crawling along the first wall will be blocked by the first tube from traversing an end of the first tube that emits light; and,
wherein the photoelectric receiver includes a second tube that extends out from a second wall a sufficient length so that bugs crawling along the second wall will be blocked by the second tube from traversing an end of the second tube that receives light from the light emitter.

6. A drift fence camera trap as in claim 1, additionally comprising:
a lid, the lid including a locking pin slot and a sash lock.

7. A drift fence camera trap enclosure comprising
a frame;
sheathing mounted on the frame;
a first wall and a second wall that define boundaries of an opening that extends from a first side of the drift fence camera trap enclosure to a second side of the drift camera enclosure;
a threshold located within the opening;
a detection unit that detects passage of cold-blooded animals and small mammals over the threshold, the detection unit including:
  a light emitter and a photoelectric receiver, the light emitter directing light from the light emitter to the photoelectric receiver,
  wherein the light emitter includes a first bug tube that extends out from the first wall so that bugs crawling along the first wall will be blocked by the first bug tube from traversing an end of the first bug tube that emits light, and
  wherein the photoelectric receiver includes a second bug tube that extends out from the second wall so that bugs crawling along the second wall will be blocked by the second bug tube from traversing an end of the second bug tube that receives light from the light emitter; and,
a camera, configured to capture pictures or video of the cold-blooded animals and small mammals as the animals cross the threshold.

8. A drift fence camera trap enclosure as in claim 7, additionally comprising:
a flat grid matrix ramp situated at or near the elevated threshold, the flat grid matrix ramp providing a matrix suitable for use in measuring size of the cold-blooded animals and small mammals in the captured pictures or video.

9. A drift fence camera trap enclosure as in claim 7, additionally comprising:
mounting spikes used to anchor the drift fence camera trap enclosure into ground.

10. A drift fence camera trap enclosure as in claim 7 wherein the camera is mounted on a lid of the drift camera enclosure.

11. A drift fence camera trap enclosure as in claim 7, additionally comprising:
a lid, the lid including a locking pin slot and a sash lock.

12. A method for capturing pictures or video of cold-blooded animals and small mammals, comprising;
placing a drift camera enclosure;
providing an opening in the drift fence camera trap enclosure through which cold-blooded animals and small mammals traverse the drift camera enclosure;
providing a first funnel drift section connected to the drift camera enclosure, the first funnel drift section extending to the ground so as to funnel cold-blooded animals and small mammals towards the drift camera enclosure;
providing a second funnel drift section connected to the drift camera enclosure, the second funnel drift section extending to the ground so as to funnel cold-blooded animals and small mammals towards the drift camera enclosure, wherein the second funnel drift section is at an acute or an obtuse angle with respect to the first funnel drift section so that cold-blooded animals and small mammals from an area wider than the opening are funneled towards the opening;
providing a third funnel drift section connected to the drift camera enclosure, the third funnel drift section extending to the ground so as to funnel cold-blooded animals and small mammals towards the drift camera enclosure;
providing a fourth funnel drift section connected to the drift camera enclosure, the fourth funnel drift section extending to the ground so as to funnel cold-blooded animals and small mammals towards the drift camera enclosure, wherein the third funnel drift section is at an acute or an obtuse angle with respect to the fourth funnel drift section so that cold-blooded animals and small mammals from an area wider than the opening are funneled towards the opening;
providing a threshold located within the opening;
detecting passage of cold-blooded animals and small mammals over the threshold; and,
configuring a camera to capture pictures or video of the cold-blooded animals and small mammals as the cold-blooded animals and small mammals cross the elevated threshold.

13. A method as in claim 12, additionally comprising:
placing a flat grid matrix ramp at or near the elevated threshold, the flat grid matrix ramp providing a matrix suitable for use in measuring size of the cold-blooded animals and small mammals in the captured pictures or video.

14. A method as in claim 12, additionally comprising:
using mounting spikes to anchor the drift fence camera trap enclosure into ground.

15. A method as in claim 12:
wherein detecting passage of cold-blooded animals and small mammals over the threshold includes using a light emitter and a photoelectric receiver, the light emitter directing light from the light emitter to the photoelectric receiver, wherein the light emitter includes a first tube that extends out from a first wall a sufficient length so that bugs crawling along the first wall will be blocked by the first tube from traversing an end of the first tube that emits light, and wherein the photoelectric receiver includes a second tube that extends out from a second wall a sufficient length so that bugs crawling along the second wall will be blocked by the second tube from traversing an end of the second tube that receives light from the light emitter.

* * * * *